April 11, 1939.  E. R. BERGMANN  2,154,060
FEEDING MECHANISM FOR SHAKER OR JIGGING CONVEYERS
Original Filed June 19, 1936  2 Sheets-Sheet 2
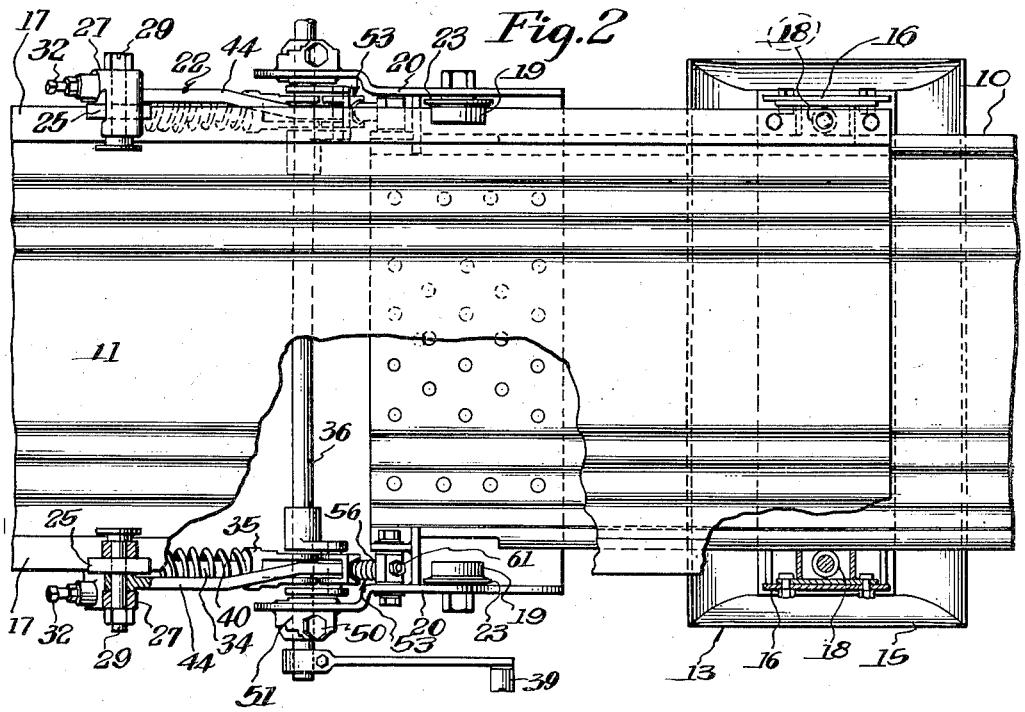
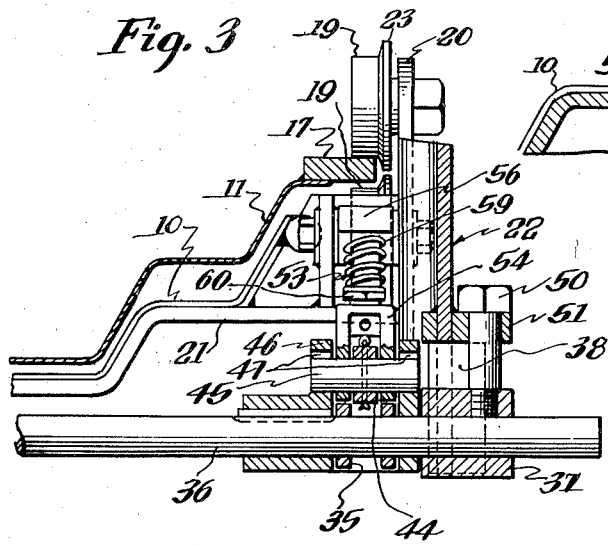
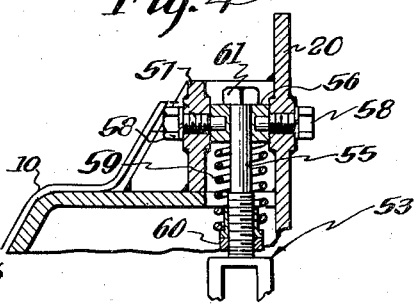
Inventor
Ernst R. Bergmann
Clarence F. Poole
Attorney Patented Apr. 11, 1939

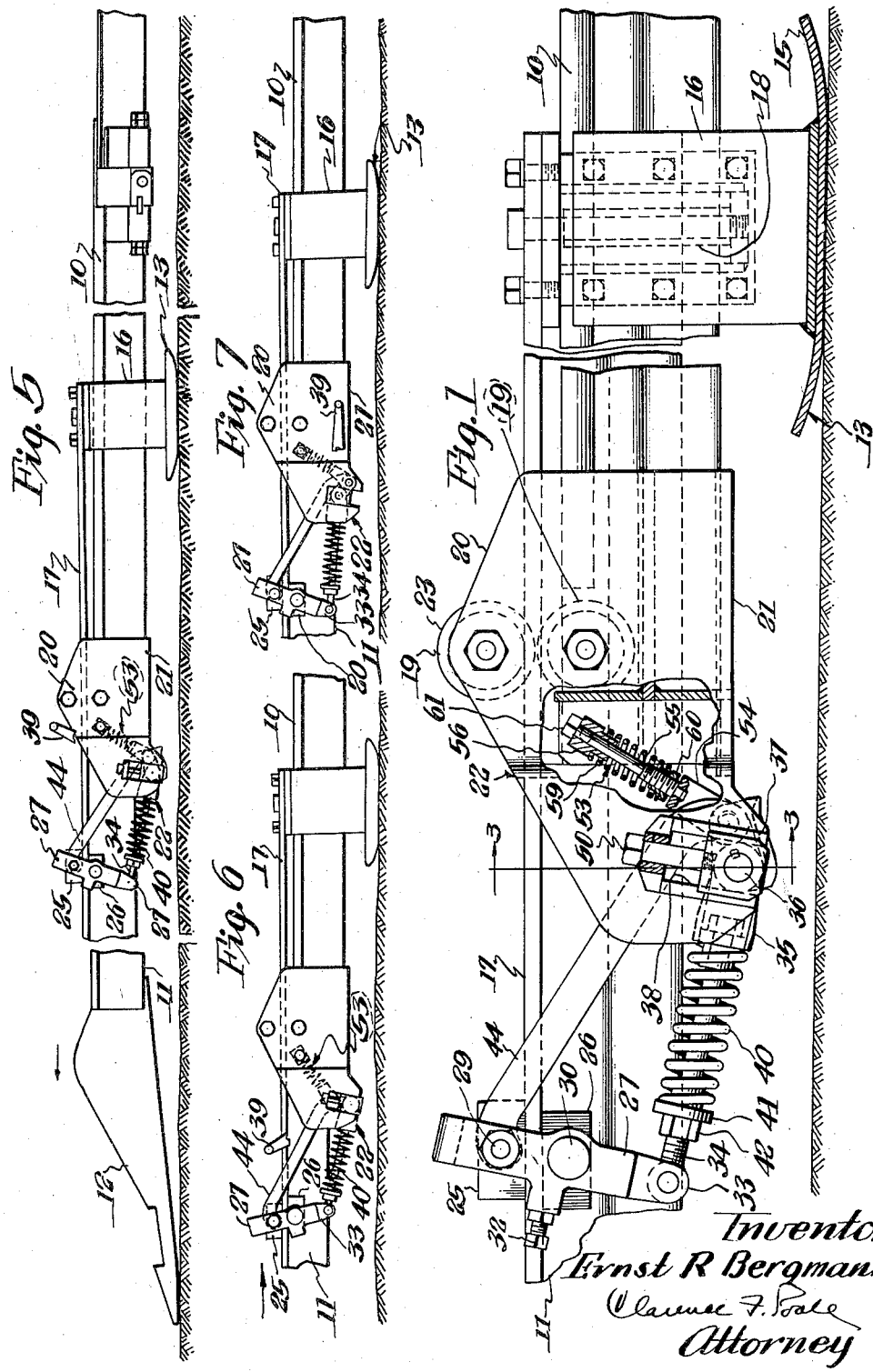

2,154,060

UNITED STATES PATENT OFFICE 2,154,060

FEEDING MECHANISM FOR SHAKER OR JIGGING CONVEYERS

Ernst R. Bergmann, Chicago, Ill., assignor to Goodman Manufacturing Company, Chicago, Ill., a corporation of Illinois Application June 19, 1936, Serial No. 86,154
Renewed January 12, 1938

19 Claims. (Cl. 198—220)

This invention relates to improvements in feeding mechanisms for shaker or jigging conveyers of the type utilized for picking up and transporting loose material such as coal, rock or the like.

More specifically my invention relates to improvements in the construction of feeding mechanisms attached to the loading end of reciprocating conveyers and has as its principal objects to provide a novel arrangement of feeding mechanism of a simple construction so arranged that the extension or retraction of an extensible trough section having a gathering shovel at the forward end thereof may be effected by the reciprocating action of the conveyer.

My invention may be more clearly understood with reference to the accompanying drawings wherein:

Figure 1 is a detail fragmentary view in side elevation of a portion of a conveyer trough line having a feeding mechanism constructed in accordance with my invention associated therewith, with parts of the feeding mechanism broken away and shown in substantially longitudinal section in order to illustrate certain details of my invention;

Figure 2 is a fragmentary plan view of the device shown in Figure 1, drawn to a slightly smaller scale, with certain parts broken away and in section in order to more clearly illustrate certain details of my invention not shown in Figure 1;

Figure 3 is an enlarged detail vertical sectional view taken substantially along line 3—3 of Figure 1;

Figure 4 is an enlarged partial fragmentary vertical detail transverse sectional view showing certain details of the feeding mechanism not shown in Figure 3; and Figures 5, 6 and 7 are diagrammatic views showing the feeding mechanism in various operative positions for extending or retracting the pick-up member or holding the troughs in fixed relation with respect to each other.

In the drawings, the main elements of the embodiment of the invention illustrated consist of a reciprocating trough section 10, connected to the forward end of a reciprocating shaker conveyer pan line, which has an extensible trough section or pick-up member 11 adapted to be telescopically extended or retracted with respect thereto. Said extensible trough section has a flared gathering shovel 12 extending from the forward end thereof which is adapted to rest on and slidably move along the ground.

The extensible trough section or pick-up member 11 slides along the ground at its forward end on the gathering shovel 12, and is supported above the ground at its rearward end on a shoe 13, which slidably engages the ground. Said shoe comprises a transversely extending ground engaging member 15 having parallel spaced upright sides 16, 16 extending from opposite sides thereof upwardly along each side of the conveyer trough section 10. Said upright sides are secured at their upper ends to the under side of bearing plates 17, 17, which extend laterally from the upper flanges of said extensible trough section. Suitable rollers 18, 18 are mounted in the upright sides 16, 16 to engage the sides of said reciprocating trough section.

The forward end of the reciprocating trough section 10 is supported and guided for reciprocable movement along the extensible trough section 11 by means of two sets of parallel-spaced rollers 19, 19. Said rollers are mounted in upstanding sides 20, 20 of a bracket member 21 of a feeding head 22. Said bracket member extends across the bottom of and upwardly along the sides of said reciprocating trough section and, as herein shown, is secured thereto by means of rivets in a usual manner.

Each of the rollers 19, includes one roller adapted to rest on and roll along the upper surface of the bearing plate 17 and another roller disposed beneath said bearing plate and acting as a guide to prevent vertical displacement of said trough sections with respect to each other. Said rollers are each provided with suitable flanges 23, 23 on the outer sides thereof adapted to engage the outer sides of the bearing plates 17, 17 and cooperate with the rollers 18, 18 to guide the pick-up member 11 against lateral displacement.

It will be seen from the foregoing that the extensible trough section or pick-up member 11 is supported for slidable movement along the ground at its forward and rearward ends and that the frictional resistance of said trough section against the ground, together with the lack of frictional resistance between the troughs due to the anti-friction support afforded by the rollers 19, 19, is such that said extensible trough will remain stationary while said reciprocating trough section reciprocably moves therealong, when the feeding mechanism is disengaged from the bearing plates 17, 17.

With reference now in particular to the details of the feeding head and the novel arrangement whereby the extensible trough section or pick-up member 11 may be extended or retracted with respect to the reciprocating trough section 10 by the action of the shaker conveyer, said feeding head consists of two sets of friction grip blocks 25 and 26, each of which sets is adapted to engage the upper and lower surfaces of one of the bearing plates 17. Each set of friction blocks is mounted in a carrier member 27 of a C-shaped formation arranged with the open portion thereof extending inwardly along the bearing plate 17. One carrier member is provided at each side of the extensible trough section 11 and in advance of the reciprocating trough section 10, and is mounted for free movement with respect to the bracket member 21 in a vertical plane to permit feeding when the trough sections are inclined at various angles with respect to each other. Since the construction and operation of each carrier member is similar, a description of one will suffice for both.

The upper friction grip block 25 is mounted in the C-shaped carrier 27 above the open portion thereof on a transversely extending bolt 29, while the lower friction grip block 26 is mounted below said open portion on an adjustable eccentric 30, the details of which are not herein shown or described, since they are no portion of my present invention. Said grip blocks are adjustably moved toward or from each other to take care of wear by means of a set screw 32 engaging the eccentric 30 in a manner which is not herein shown or described in detail since it is no portion of my present invention, and is clearly described in a prior application, Serial No. 62,582, filed by me February 6, 1936, now Patent No. 2,132,718, dated October 11, 1938.

The carrier member 27 has a depending ear 33 to which is pivoted a threaded eye bolt 34 which extends rearwardly therefrom. The opposite end of said threaded eye bolt is slidably mounted in a bifurcated connecting bracket 35 and has a nut threaded thereon which abuts the inner side of said bracket. The ends of said bracket are pivotally connected to a shaft 36 extending transversely across the bracket member 21 beneath the trough sections 10 and 11. Said shaft is mounted in spaced-apart blocks 37, 37 which are slidably guided in upwardly and angularly rearwardly extending guides 38, 38 formed in each upstanding side 20 of the bracket member 21. Downward movement of each block 37 in its guide 38 is limited by the head of a cap screw 50 threaded in the upper side of the block 37 and extending through a bored upper portion 51 of each guide and slidably guided therein. Hand levers 39, 39 are secured to opposite ends of said shaft for positioning said carrier and grip blocks in various operative positions.

A compression spring 40 encircles the threaded eye bolt 34 and is interposed between the connecting bracket 35 and a collar 41 abutting a nut 42 threaded on said eye bolt adjacent the carrier member 27. Compression of said spring may be adjusted by means of said nut in an obvious manner. The purpose of this arrangement, as just described, is to form a pivotal support for said carrier member and a yieldable linkage connection between said carrier member and the bracket 21 which will yield in a rearward direction and permit the grip blocks to be released from the bearing plates 17, 17 during extensible movement of the extensible trough section when the forward end of the shovel 12 engages an obstruction.

A link 44 is pivotally connected to the carrier member 27 adjacent the upper end thereof on the bolt 29. Said link extends rearwardly and downwardly therefrom and its opposite end is secured to a shaft 45 in a suitable manner. Said shaft is mounted at its ends in aligned elongated slots 47, 47 formed in a bifurcated free end of a crank arm 46 (see Figure 3). Said crank arm in turn is keyed to the transverse shaft 36 on opposite sides of the bifurcated connecting bracket 35.

The carrier member 27 and friction grip blocks 25 and 26 are held in various operative positions of adjustment for extending or retracting the conveyer, as desired, by means of a spring link, generally indicated by reference character 53. Said spring link is pivotally connected to the outer side 20 of the bracket member 21 and is interposed between said bracket member and the free end of the crank arm 46. Said spring link consists of a bifurcated member 54 pivotally mounted at its ends on the shaft 45 on opposite sides of the link 44, and a threaded rod 55 secured thereto and extending therefrom. Said threaded rod is slidably mounted in a block 56 which is trunnioned in the bracket member 21, between one upright side 20 and an inwardly disposed parallel-spaced bracket 57 by means of cap screws 58, 58. As herein shown, said cap screws have machined ends engaging oppositely disposed drilled portions in said block (see Figure 4). A compression spring 59 encircles the rod 55 and is interposed between the under side of the block 56 and a collar 60 threaded on said member adjacent the upper side of the bifurcated member 54. Thus, the member 53 engages the shaft 45 with the crank arm 46 through the spring 59 and said spring link may slidably move upwardly with respect to the block 56, although downward movement of said link is limited by a head 61 adapted to engage the upper side of said block.

It should herein be noted that the slots 47, 47 permit considerable play between the shaft 45 and the crank arm 46 which allows for variations in positions of the grip blocks 25 and 26 due to wear thereon. Thus, since said shaft is continually forced in a downward direction by the spring 59 and may move along the slot 47 to compensate for varying positions of the link 44 due to wear on either of the grip blocks 25 or 26, an automatic take up is formed, which acts in addition to the adjusting screw 32.

With reference now in particular to Figures 5, 6 and 7, and the operation of the feeding mechanism illustrated, in Figure 5 the carrier members 27 and grip blocks 25 and 26 are shown in position to extend the extensible trough section 11. This position is attained by pivoting the shaft 36 by either one of the hand levers 39 until the cranks 46 are past dead center with respect to the pivotal axes of the links 53, 53, in a rearward direction and the carrier members 27, 27 and the respective grip blocks 25 and 26 are in a rearwardly inclined position. When the carrier members 27, 27 and blocks 25 and 26 are in this position, said carrier members and blocks will be pivoted about the axes of connection of the bolts 29, 29 to the links 44, 44 and engaged with the bearing plates 17, 17 upon the forward stroke of the conveyor by means of the links formed by the brackets 35, 35, compression springs 40, 40 and eye bolts 34, 34. This will cause the extensible trough to move forwardly with the reciprocating trough section upon the forward stroke of the conveyer. Upon the return stroke of the conveyer, frictional resistance of the trough 11 against the ground on the forward end of the shovel 12 and the shoe 13 will hold said trough section from movement with respect to the ground. This will cause the carrier members 27, 27 to pivot in a rearward direction about their axes of connection to the links 44, 44, which will disengage the blocks 25 and 26 from said bearing plates. At the same time the links 44, 44 will tend to pivot the crank arms 46, 46 in an upward direction against the spring links 53, 53. As soon as the return stroke has been completed said spring links will tend to move said cranks in a downward direction to properly position said grip blocks with respect to said bearing plates.

In Figure 6 the parts are positioned for retracting the extensible trough section 11 within the reciprocating trough section 10 by turning the hand lever 39 in a counterclockwise direction until the cranks 46, 46 are in an opposite position past dead center with respect to the shaft 36 and the axes of the spring links 53, 53, than in Figure 5 and the carrier members 27, 27 in a forwardly inclined position. When the parts are in such a position, pull of the rods 34, 34 will engage the grip blocks 25 and 26 with the bearing plates 17, 17 upon the return stroke of the conveyer and the pushing force of said rod, will release said grip blocks therefrom upon the forward stroke of the conveyer.

It should herein be noted that the chief purpose of the spring links 53, 53 is to take the place of the hand on either of the hand cranks 39, 39 during operating of the conveyer and adjustably hold the grip blocks 25 and 26 in the proper position with respect to the bearing plates 17, 17 to extend or retract the extensible trough section, depending upon the position of the hand crank 39. When said hand crank has been moved to position the carrier members 27, 27 to extend the extensible trough section, said spring links exert a pulling force against the links 44, 44 to hold said carrier members in a rearwardly inclined position, and the links formed by the eyebolts 34, 34 and the springs 40, 40 exert a forward pushing force against the lower end of said carrier members which reacts against the links 44, 44 and springs 59, 59 and counteracts any tendency of said spring links to engage said grip blocks with said bearing plates.

In Figure 7 the grip blocks are shown in a locked position with respect to the bearing plates 17, 17 for moving the extensible trough section 11 with the reciprocating trough section 10. When in this position, either one of the hand levers 39 is moved in a clockwise direction beyond the position shown in Figure 5. This pivots the crank arms 46, 46 and tends to move the shaft 36 and blocks 37, 37 upwardly along the guides 38, 38. This also compresses the compression spring 59 of the spring link 53 which holds the parts in said locked position until released by either one of the hand levers 39.

While I have herein shown and described one form in which my invention may be embodied, it will be understood that the construction thereof and the arrangement of the various parts may be altered without departing from the spirit and scope thereof. Furthermore, I do not wish to be construed as limiting myself to the specific embodiment illustrated, except as it may be limited in the appended claims.

I claim as my invention:

1. A loading attachment for a shaker conveyer comprising an extensible trough section supported so that its entire weight rests on the ground independently of the conveyer and adapted to form a support for a reciprocatory trough section attached to the end of the conveyer, and a friction gripping connection between said reciprocatory trough section and said extensible trough section, including a pair of friction grip blocks and a connection between said reciprocating trough section and friction grip blocks for engaging said grip blocks with and disengaging said grip blocks from said extensible trough section during certain strokes of the conveyer operable solely by reciprocable movement of the conveyer due to resistance of said extensible trough on the ground for extending or retracting said extensible trough with respect to said reciprocatory trough.

2. In a reciprocating conveyer, a conveyer trough, an extensible trough telescopically extensible with respect to said conveyer trough, and means actuated by reciprocable movement of the conveyer for automatically extending or retracting said extensible trough with respect to said conveyer trough comprising a feeding device connected to said conveyer trough including a clamping device adapted to engage said extensible trough, and means for oscillating said clamping device into and out of clamping position with respect to said trough comprising a link connected between one end of said clamping device and a shaft mounted on said conveyer trough, a second link connected to the other end of said clamping device, a pivotal connection from said second-mentioned link to said shaft at a point spaced from the pivotal axis thereof, and resilient means associated with said second-mentioned link to hold said clamping device in the proper position of adjustment with respect to said extensible trough upon the initial part of the feed stroke of the conveyer.

3. In a reciprocating conveyer, a conveyer trough, an extensible trough telescopically extensible with respect to said conveyer trough, and means actuated by reciprocable movement of the conveyer for automatically extending or retracting said extensible trough with respect to said conveyer trough comprising a feeding device connected to said conveyer trough including a clamping device adapted to engage said extensible trough, and automatic means for oscillating said clamping device into and out of clamping position with respect to said trough comprising a link connected between one end of said clamping device and a shaft mounted on said conveyer trough, a second link connected to the other end of said clamping device, a crank arm on said shaft, a pivotal connection between said second-mentioned link and the free end of said crank arm, and a spring pivotally connected between said conveyer trough and crank arm to hold said clamping device in the proper position of adjustment with respect to said conveyer trough upon the initial part of the feeding stroke thereof.

4. In a reciprocating conveyer, a conveyer trough, an extensible trough telescopically extensible with respect to said conveyer trough, and means actuated by reciprocable movement of the conveyer for automatically extending or retracting said extensible trough with respect to said conveyer trough comprising a clamping device including a carrier member pivotally connected to and disposed in advance of said conveyer trough and having a pair of friction grip blocks mounted therein adapted to engage said extensible trough above and below a portion thereof, and means for oscillating said carrier member to bring said grip blocks into and out of clamping position with respect to said trough comprising a link connected to one end of said carrier member, a shaft supported by said conveyer trough, a pivotal connection between said link and shaft, a second link pivotally connected to the other end of said carrier member, a crank arm on said shaft and a pivotal connection between said crank arm and the free end of said second-mentioned link, and resilient means pivotally supported by said conveyer trough and engaging said crank arm to adjustably hold said grip blocks in the proper clamping position with respect to said extensible trough.

5. In a reciprocating conveyer, a conveyer trough, an extensible trough telescopically extensible with respect to said conveyer trough, and means actuated by reciprocable movement of the conveyer for automatically extending or retracting said extensible trough with respect to said conveyer trough comprising a clamping device including a pair of carrier members pivotally connected to and disposed in advance of said conveyer trough and having a pair of friction grip blocks mounted therein adapted to engage opposite sides of said extensible trough above and below a portion thereof, and means for oscillating said carrier members to bring said grip blocks into and out of clamping position with respect to said trough comprising a link pivotally connected to one end of each of said carrier members, a shaft supported by and extending transversely of said conveyer trough, a pivotal connection between said link and shaft, a second link pivotally connected to the other end of each of said carrier members, a pair of laterally spaced crank arms on said shaft and a pivotal connection between said crank arms and the free ends of said second-mentioned links, and resilient means engaging said crank arms to adjustably hold said grip blocks in the proper clamping position with respect to said extensible trough comprising spring links pivotally mounted on said conveyer trough and having engagement with said cranks.

6. In a reciprocating conveyer, a conveyer trough, an extensible trough telescopically extensible with respect to said conveyer trough, means actuated by reciprocable movement of the conveyer for automatically extending or retracting said extensible trough comprising a clamping device including a carrier member pivotally connected to and disposed in advance of said conveyer trough and having a pair of friction grip blocks mounted therein adapted to engage said extensible trough above and below a portion thereof, and means for oscillating said carrier member to bring said grip blocks into and out of clamping position with respect to said extensible trough comprising a link connected to the lower end of said carrier member, a shaft supported by said conveyer trough beneath the bottom of said extensible trough, and a pivotal connection between said link and shaft, a second link pivotally connected to said carrier member above the top of said extensible trough, a crank on said shaft, a pivotal connection between the free end of said second link and crank, and a spring link pivotally connected between said conveyer trough and crank to resiliently hold said crank in a position with respect to said shaft and the pivotal axis of said link, which is past dead center and hold said grip blocks in the proper position of adjustment with respect to said extensible trough section.

7. In a reciprocating conveyer, a conveyer trough, an extensible trough telescopically extensible with respect to said conveyer trough, means actuated by reciprocable movement of the conveyer for automatically extending or retracting said extensible trough with respect to said conveyer trough comprising a clamping device including a carrier member pivotally connected to and disposed in advance of said conveyer trough and having a pair of friction grip blocks mounted therein and adapted to engage said extensible trough above and below a portion thereof, and means for oscillating said carrier member to bring said grip blocks into and out of clamping position with respect to said trough comprising a link connected to the lower end of said carrier member, a shaft disposed beneath the bottom of said extensible trough and a pivotal connection between said link and shaft, a second link pivotally connected to said carrier member above the top of said extensible trough, a crank on said shaft and a pivotal connection between the free end of said second link and crank, a spring link pivotally connected to said conveyer trough and engaging said crank to resiliently hold said crank in a position with respect to said shaft and the pivotal axis of said link which is past dead center and hold said grip blocks in the proper position of adjustment with respect to said extensible trough section, and manually operable means engaging said shaft to position said crank and carrier member to extend or retract said extensible trough.

8. In a feeding head for a shaker conveyer and in combination with an extensible trough, a clamping device carried by said head, and automatic means actuated by reciprocable movement of the conveyer due to resistance of said trough on the ground and adjustable to extend or retract said trough at will for oscillating said clamping device into and out of clamping position with respect to said trough comprising a link pivotally connected to one end of said clamping device, another link pivotally connected to the other end of said clamping device, a shaft mounted in said feeding head and having one of said links pivotally connected thereto, a crank arm on said shaft, a connection from said crank arm to said other link, and resilient means pivotally connected between said feeding head and crank to hold said crank in a position with respect to said shaft and the pivotal axis of said resilient means which is past dead center and hold said clamping device in the proper position of adjustment with respect to said extensible trough section.

9. In a feeding head for a shaker conveyer and in combination with an extensible trough, a clamping device carried by said head, and automatic means actuated by reciprocable movement of the conveyer due to resistance of said trough on the ground and adjustable to extend or retract said trough at will for oscillating said clamping device into and out of clamping position with respect to said trough comprising a link connected to the upper end of said clamping device, another link connected to the lower end of said clamping device, a shaft mounted in said feeding head and having said second-mentioned link pivotally connected thereto, a connection from said first-mentioned link to said shaft at a point spaced therefrom, and resilient means associated with said first-mentioned link and pivotally connected to said feeding head to hold said clamping device in the proper position of adjustment with respect to said extensible trough.

10. In a feeding head for a shaker conveyer and in combination with an extensible trough, a clamping device carried by said head, and automatic means actuated by reciprocable movement of the conveyer due to resistance of said trough on the ground and adjustable to extend to retract said trough at will for oscillating said clamping device into and out of clamping position with respect to said trough comprising a link connected to the upper end of said clamping device, another link connected to the lower end of said clamping device, a shaft pivotally mounted in said feeding head in advance of the forward end of said conveyer trough and beneath the bottom of said extensible trough, a pivotal connection from said lower link to said shaft, a crank arm on said shaft, a pivotal connection from said upper link to said crank arm, and a spring link pivotally mounted on said feeding head and having pivotal connection with said crank arm to resiliently hold said crank arm in a position with respect to said shaft and the axis of pivotal connection of said spring link to said feeding head which is past dead center and hold said clamping device in the proper position of adjustment with respect to said extensible trough section.

11. In a feeding head for a shaker conveyer and in combination with an extensible trough, a clamping device carried by said head, and automatic means actuated by reciprocable movement of the conveyer due to resistance of said trough on the ground and adjustable to extend or retract said trough at will for oscillating said clamping device into and out of clamping position with respect to said trough comprising a link connected to the upper end of said clamping device, another link connected to the lower end of said clamping device, a shaft pivotally mounted in said feeding head in advance of the forward end of said conveyer trough and beneath the bottom of said extensible trough, a pivotal connection from said lower link to said shaft, a crank arm on said shaft, a pivotal connection from said upper link to said crank arm, and a spring link interposed between said feeding head and crank arm to resiliently hold said crank arm in a position with respect to said shaft which is past dead center for properly holding said clamping device in position with respect to said extensible trough section, and manually operable means engaging said shaft to position said clamping device to extend or retract said extensible trough at will.

12. In a feeding head for a shaker conveyer and in combination with an extensible trough, a clamping device carried by said head including a pair of grip blocks adapted to engage said extensible trough above and below a portion thereof, and automatic means actuated by reciprocable movement of the conveyer due to resistance of said trough on the ground and adjustable to extend or retract said trough at will for oscillating said clamping device into and out of clamping position with said trough comprising a link connected to the upper end of said clamping device, another link connected to the lower end of said clamping device, a shaft mounted in said feeding head and having said second-mentioned link pivatolly connected thereto, a crank on said shaft, a spring link pivotally mounted on said feeder head, and a connection between said first-mentioned link, said spring link, and said crank, permitting automatic adjustment of said grip blocks to compensate for wear thereof, comprising a shaft having said first-mentioned link secured thereto and being engaged by said spring link, and an elongated slot in said crank adapted to receive said shaft to permit limited slidable movement of said shaft with respect thereto.

13. In a loading attachment for a shaker conveyer, an extensible trough section, a shoe supporting the rearward end of said trough on the ground so that its forward end may slidably engage the ground, a reciprocating trough section attached to the forward end of the conveyer and supported at its forward end for movement along said extensible trough section, and feeding means on said reciprocating trough section including a pair of friction grip blocks and a connection between said shaker conveyer and friction grip blocks for engaging said grip blocks with and disengaging said grip blocks from said extensible trough section during certain strokes of the conveyer operable solely by reciprocable movement of the conveyer due to resistance of said extensible trough on the ground for extending or retracting said extensible trough with respect to said reciprocating trough.

14. In a loading attachment for a shaker conveyer, an extensible trough section, a shoe supporting the rearward end of said trough on the ground so that its forward end may slidably engage the ground, a reciprocating trough section attached to the forward end of the conveyer and supported at its forward end for movement along said extensible trough section, and feeding means on said reciprocating trough section operable by reciprocable movement of the conveyer due to resistance of said extensible trough on the ground for extending or retracting said extensible trough with respect to said reciprocating trough, comprising a clamping device disposed in advance of said reciprocating trough, a transverse shaft, a link pivotally connected from one end of said clamping device to said shaft, another link pivotally connected between said clamping device and shaft at a point spaced therefrom, and yieldable means engaging said link and reacting against said link and shaft to hold said clamping device in the proper position of adjustment with respect to said extensible trough section.

15. In a feeding mechanism for shaker conveyers, an extensible trough section slidably supported on the ground at its forward end and above the ground at its rearward end on a shoe slidably engaging the ground, a conveyer trough section supported for movement along said extensible trough section and adapted to have said extensible trough section telescopically extended or retracted with respect thereto, a feeding head on the forward end of said conveyer trough section including a clamping device disposed in advance thereof, and means actuated by reciprocable movement of the conveyer due to resistance of said trough on the ground, for automatically oscillating said clamping device into and out of clamping position with respect to said extensible trough comprising a transverse shaft on said feeding head, a link pivotally connected from one end of said clamping device to said shaft, a crank arm on said shaft, a link pivotally connected from the other end of said clamping device to said crank arm, and resilient means pivotally mounted on said feeding head and engaging said crank arm to hold said crank arm in a position with respect to said shaft, and the pivotal axis of said resilient means, which is past dead center, to position said clamping device in the proper position of adjustment with respect to said extensible trough section.

16. In a feeding mechanism for shaker conveyers, an extensible trough section slidably supported on the ground at its forward end and above the ground at its rearward end on a shoe slidably engaging the ground, a conveyer trough section supported for movement along said extensible trough section and adapted to have said extensible trough section telescopically extended or retracted with respect thereto, a feeding head on the forward end of said conveyer trough section including a clamping device disposed in advance thereof, and means actuated by reciprocable movement of the conveyer due to frictional resistance of said trough on the ground, for automatically oscillating said clamping device into and out of clamping position with respect to said extensible trough comprising a transverse shaft on said feeding head, a link pivotally connected from one end of said clamping device to said shaft, a crank arm on said shaft, a link pivotally connected from the other end of said clamping device to said crank arm, resilient means pivotally mounted on said feeding head and engaging said crank arm to hold said crank arm in a position with respect to said shaft, and the pivotal axis of said resilient means, which is past dead center, to position said clamping device in the proper position of adjustment with respect to said extensible trough section, and manually operable means engaging said shaft to position said crank arm and clamping device to extend or retract said extensible trough at will.

17. In a feeding mechanism for shaker conveyers, an extensible trough section slidably supported on the ground at its forward end and above the ground at its rearward end on a shoe slidably engaging the ground, a conveyer trough section supported for movement along said extensible trough section and adapted to have said extensible trough section telescopically extended or retracted with respect thereto, a feeding head on the forward end of said conveyer trough section including a clamping device disposed in advance thereof, and means actuated by reciprocable movement of the conveyer due to frictional resistance of said trough on the ground, for automatically oscillating said clamping device into and out of clamping position with respect to said extensible trough comprising a transverse shaft on said feeding head, a link pivotally connected from the lower end of said clamping device to said shaft, a crank arm on said shaft, a link pivotally connected from said clamping device at a point disposed above the upper end of said extensible trough to said crank arm, and a spring link pivotally connected to said feeding head and having engagement with said crank arm to resiliently hold said crank arm in a position with respect to said shaft and the pivotal axis of said link which is past dead center and hold said clamping device in the proper position of adjustment with respect to said extensible trough section.

18. In a feeding mechanism for shaker conveyers, an extensible trough section slidably supported on the ground at its forward end and above the ground at its rearward end on a shoe slidably engaging the ground, a conveyer trough section supported for movement along said extensible trough section and adapted to have said extensible trough section telescopically extended or retracted with respect thereto, a feeding head on the forward end of said conveyer trough section including a pair of clamping devices disposed in advance thereof on opposite sides of said extensible trough, each of said clamping devices including a pair of friction grip blocks adapted to engage opposite sides of said extensible trough section above and below a portion thereof, and means actuated by reciprocable movement of the conveyer due to frictional resistance on said extensible trough on the ground, for automatically oscillating said grip blocks into and out of clamping position with respect to said extensible trough comprising a transverse shaft on said feeder head extending beneath said extensible trough, a link pivotally connected from the lower end of each of said clamping devices to said shaft, a pair of spaced crank arms on said shaft, a link pivotally connected with each of said clamping devices at a point disposed above said extensible trough at one of its ends and pivotally connected to each of said crank arms at its opposite end, and resilient means pivotally mounted on said feeding head and engaging said crank arms to hold said crank arms and second-mentioned links in a position with respect to said shaft, and the pivotal axes of said resilient means, which is past dead center, to hold said clamping devices in the proper position of adjustment with respect to said extensible trough section.

19. In a feeding mechanism for shaker conveyers, an extensible trough section slidably supported on the ground at its forward end and above the ground at its rearward end on a shoe slidably engaging the ground, a conveyer trough section supported for movement along said extensible trough section and adapted to have said extensible trough section telescopically extended or retracted with respect thereto, a feeding head on the forward end of said conveyer trough section including a pair of clamping devices disposed in advance thereof on opposite sides of said extensible trough, each of said clamping devices including a pair of friction grip blocks adapted to engage opposite sides of said extensible trough section above and below a portion thereof, and means actuated by reciprocable movement of the conveyer due to frictional resistance of said extensible trough on the ground, for automatically oscillating said grip blocks into and out of clamping position with respect to said extensible trough comprising a shaft on said feeder head extending transversely beneath said extensible trough, a link pivotally connected from the lower end of each of said clamping devices to said shaft, a pair of spaced crank arms on said shaft, a link pivotally connected from the upper end of each of said clamping devices to each of said crank arms, and a spring link pivotally connected to each side of said feeding head and engaging said crank arms at the point of pivotal connection of said last-named links thereto, to hold said crank arms in a position with respect to said shaft and the pivotal axes of said spring links which is past dead center, to hold said clamping devices in the proper position of adjustment with respect to said extensible trough section.

ERNST R. BERGMANN.